(12) United States Patent
Fu (10) Patent No.: US 12,476,247 B2
(45) Date of Patent: Nov. 18, 2025

(54) ELECTROCHEMICAL DEVICE AND ELECTRONIC DEVICE

(71) Applicant: NINGDE AMPEREX TECHNOLOGY LIMITED, Ningde (CN)

(72) Inventor: Ao Fu, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 642 days.

(21) Appl. No.: 17/741,295

(22) Filed: May 10, 2022

(65) Prior Publication Data

US 2022/0328811 A1  Oct. 13, 2022

Related U.S. Application Data

(63) Continuation of application No. PCT/CN2022/084268, filed on Mar. 31, 2022.

(30) Foreign Application Priority Data

Mar. 31, 2021 (CN) .......................... 202110353452.8

(51) Int. Cl.
*H01M 4/587* (2010.01)
*H01M 4/36* (2006.01)
(Continued)

(52) U.S. Cl.
CPC ........... *H01M 4/366* (2013.01); *H01M 4/587* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| 2002/0028380 A1 | 3/2002 | Tanjo et al. |
| 2005/0142440 A1 | 6/2005 | Yamaki et al. |
| (Continued) | | |

FOREIGN PATENT DOCUMENTS

| CN | 105958124 B | 7/2018 |
| CN | 108258193 A | 7/2018 |
| (Continued) | | |

OTHER PUBLICATIONS

Robert Schroder, Muhammed Aydemir, Gunther Seliger. Comparatively assessing different shapes of lithium-ion battery cells, 14th Global Conference on Sustainable Manufacturing, GCSM Oct. 3-5, 2016, Stellenbosch, South Africa, Procedia Manufacturing 8 (2017) 104-111. (Year: 2017).*

(Continued)

*Primary Examiner* — Carlos Barcena
(74) *Attorney, Agent, or Firm* — XSENSUS LLP (57) ABSTRACT

An electrode assembly includes a first electrode plate, a second electrode plate, and a separator disposed between the first electrode plate and the second electrode plate. The first electrode plate includes a first active material layer and a second active material layer provided along the length of the electrode plate. A lithium ion diffusion rate of the first active material layer is greater than a lithium ion diffusion rate of the second active material layer.

20 Claims, 3 Drawing Sheets

(51) Int. Cl.
*H01M 10/0525* (2010.01)
*H01M 4/02* (2006.01)

(56) References Cited

U.S. PATENT DOCUMENTS

| | | | |
|---|---|---|---|
| 2010/0285356 A1* | 11/2010 | Choi | H01M 4/0435 156/60 |
| 2020/0144600 A1 | 5/2020 | Zhong | |
| 2020/0144605 A1 | 5/2020 | Su et al. | |
| 2021/0305633 A1 | 9/2021 | Xia et al. | |

FOREIGN PATENT DOCUMENTS

| | | | | |
|---|---|---|---|---|
| CN | 108352505 | A | 7/2018 | |
| CN | 109560251 | A | 4/2019 | |
| CN | 110190338 | A | 8/2019 | |
| CN | 110931706 | A | 3/2020 | |
| CN | 111029527 | A | 4/2020 | |
| CN | 111725484 | A | 9/2020 | |
| CN | 111785923 | A | 10/2020 | |
| CN | 111916844 | A | 11/2020 | |
| CN | 111916845 | A | 11/2020 | |
| CN | 111952541 | A | 11/2020 | |
| CN | 111987285 | A | 11/2020 | |
| CN | 112186273 | A | 1/2021 | |
| CN | 113097431 | A | 3/2021 | |
| CN | 113097441 | A | 7/2021 | |
| JP | 2015072805 | A | 4/2015 | |
| WO | WO-2010073930 | A1 * | 7/2010 | H01M 4/70 |
| WO | WO2013145290 | A1 | 10/2013 | |
| WO | WO2017150264 | A1 | 9/2017 | |
| WO | WO2018107743 | A1 | 6/2018 | |
| WO | WO2020238628 | A1 | 12/2020 | |

OTHER PUBLICATIONS

P. P. Prosini, M. Lisi, D. Zane, M. Pasquali. Determination of the chemical diffusion coefficient of lithium in LiFePO4, Solid State Ionics 148 (2002) 45-51.*
R. Fallahzadeh, N. Farhadian. Molecular dynamics simulation of lithium ion diffusion in LiCoO2 cathode material, Solid State Ionics 280 (2015) 10-17.*
Office Action, CN202110353452.8, Dec. 27, 2021, 20 pgs.
Second Office Action, CN202110353452.8, Jun. 15, 2022, 7 pgs.
Notice of Allowance, CN202110353452.8, Jan. 13, 2023, 5 pgs.
Ningde Amperex Technology Ltd., International Search Report and Written Opinion, PCT/CN2022/084268, May 13, 2022, 16 pgs.
Ningde Amperex Technology Ltd., Extended European Search Report, EP22711858.5, Oct. 28, 2024, 7 pgs.

* cited by examiner

ELECTROCHEMICAL DEVICE AND ELECTRONIC DEVICE

CROSS-REFERENCE TO RELATED APPLICATIONS

This application is a continuation application of PCT Patent Application No. PCT/CN2022/084268, entitled "ELECTROCHEMICAL DEVICES AND ELECTRONIC DEVICES" filed on Mar. 31, 2022, which claims priority to Chinese Patent Application No. 202110353452.8, filed with the State Intellectual Property Office of the People's Republic of China on Mar. 31, 2021, and entitled "ELECTROCHEMICAL DEVICE AND ELECTRONIC DEVICE", all of which are incorporated herein by reference in their entirety.

TECHNICAL FIELD

The application relates to the field of electrochemistry, and in particular to an electrochemical device and electronic device.

BACKGROUND

Electrochemical devices represented by lithium-ion batteries have the characteristics of high voltage, high energy density, long cycle life and no pollution, and are widely used in consumer electronic products such as mobile phones, computers, and digital cameras etc. With the development of electronic products, the requirements for electrochemical devices such as lithium-ion batteries become higher and higher, particularly in terms of high energy density and cycle life. During the charging and discharging process, ions (such as lithium ions) would be continuously deintercalated and intercalated on the electrode plate. However, due to the problems of the winding structure of the cell, such as local uneven compaction or local uneven CB (Cell balance, the ratio of directly opposite negative electrode capacity to positive electrode capacity), it leads to the problem of uneven distribution of ion transport kinetics in the cell during the cycle. In the area with insufficient kinetics, it would lead to lithium evolution in the cell, and lithium evolution would reduce the cycle performance of the cell.

SUMMARY

In view of this, the present application provides an electrochemical device and electronic device in order to improve the problem of lithium evolution from an electrode plate.

An electrochemical device provided by the present application comprises an electrode assembly, and the electrode assembly comprises: a first electrode plate, a second electrode plate, and a separator disposed between the first electrode plate and the second electrode plate. The first electrode plate comprises an active material layer, the active material layer comprises at least one first active material layer and at least one second active material layer provided along the length direction of the electrode plate, and the lithium ion diffusion rate of the first active material layer is greater than that of the second active material layer.

In some embodiments, the electrode assembly is formed by winding a first electrode plate, a second electrode plate and a separator, and the electrode assembly comprises a planar area and a corner area. The first electrode plate is a positive electrode plate, and the first positive electrode active material layer is the first positive electrode active material layer; the second positive electrode active material layer is a second positive electrode active material layer. At least part of the first active material layer is located in the planar area, and at least part of the second active material layer is located in the corner area.

In some embodiments, the first positive electrode active material layer comprises a first positive electrode conductive agent, and the second positive electrode active material layer comprises a second positive electrode conductive agent. The mass percentage of the first positive electrode conductive agent in the first positive electrode active material layer is greater than or equal to that of the second positive electrode conductive agent in the second positive electrode active material layer.

In some embodiments, the mass percentage of the first positive electrode conductive agent in the first positive electrode active material layer is 0.5% to 5.5%, and the mass percentage of the second positive electrode conductive agent in the second positive electrode active material layer is 0.5% to 5%.

In some embodiments, the compacted density of the second positive electrode active material layer is greater than or equal to that of the first positive electrode active material layer.

In some embodiments, the electrode assembly is formed by winding the first electrode plate, the second electrode plate and the separator, and the electrode assembly comprises a planar area and a corner area. The first electrode plate is a negative electrode plate, and the first active material layer is the first negative electrode active material layer, and the second active material layer is the second negative electrode active material layer. At least part of the first negative electrode active material layer is located in the corner area, and at least part of the second negative electrode active material layer is located in the planar area.

In some embodiments, the second negative electrode active material layer comprises a second negative electrode conductive agent, the first negative electrode active material layer comprises a first negative electrode conductive agent, and the mass percentage of the first negative electrode conductive agent in the first negative electrode active material layer is greater than or equal to that of the second negative electrode conductive agent in the second negative electrode active material layer.

In some embodiments, the first negative electrode active material layer comprises a first negative electrode active material, the second negative electrode active material layer comprises a second negative electrode active material, the first negative electrode active material and/or the second negative electrode active material includes graphite having a capacity per gram of 300 mAh/g to 380 mAh/g.

In some embodiments, the first electrode plate comprises a plurality of the first active material layers and a plurality of the second active material layers, and the plurality of the first active material layers and the plurality of the second active material layers are provided at intervals along the length direction of the electrode plate.

Electronic device provided by the present application comprises any one of the above-mentioned electrochemical devices.

In the electrochemical device and the electronic device of the present application, one polar electrode plate comprises an active material layer, and the active material layer comprises at least one first active material layer and at least one second active material layer provided along the length direction of the electrode plate. The lithium ion diffusion rate of the first active material layer is greater than that of the second active material layer, so that the lithium ion kinetic performance of the first active material layer is better than that of the second active material layer, thereby reducing the occurrence of lithium evolution and improving the cycle performance of the battery.

DETAILED DESCRIPTION

In order to make the objectives, technical solutions and advantages of the present application clearer, the technical solutions of the present application will be clearly described below with reference to the embodiments and the accompanying drawings. Obviously, the described embodiments are only some but not all of the embodiments. Based on the embodiments in the present application, the following embodiments and their technical features can be combined with each other without conflict.

Figure 1:
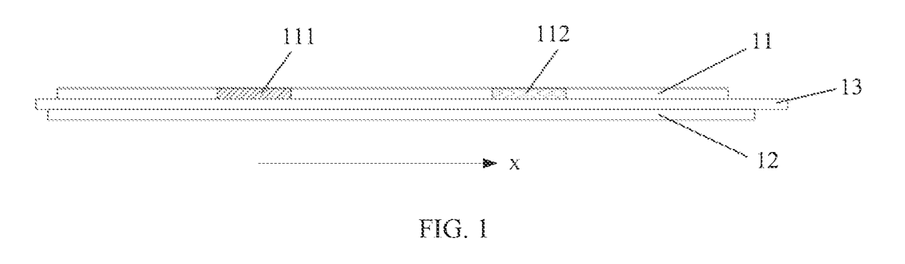
FIG. 1 is a schematic structural diagram of a first electrochemical device provided in an embodiment of the present application.
Figure 2:
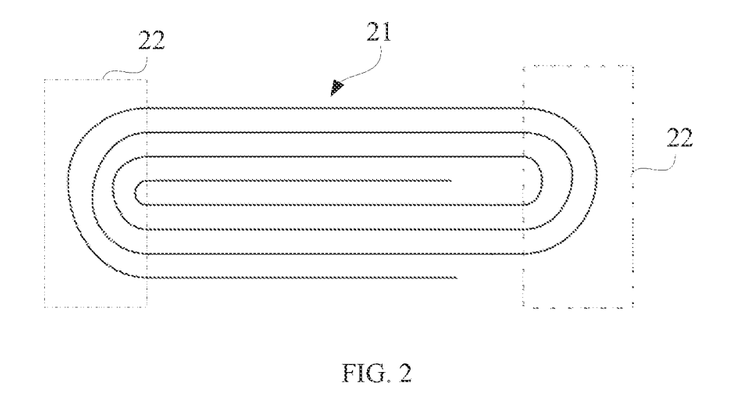
FIG. 2 is a schematic structural diagram of a second electrochemical device provided in an embodiment of the present application.

Some embodiment of the present application provides an electrochemical device, as shown in FIG. 1. The electrochemical device comprises an electrode assembly, and the electrode assembly comprises a first electrode plate 11, a second electrode plate 12, and a separator 13 provided between the first electrode plate 11 and the second electrode plate 12. In some embodiments, the electrode assembly may be a wound type structure, and the electrochemical device as shown in FIG. 2 can be obtained after wounding the first electrode plate 11, the second electrode plate 12 and the separator 13.

Electrochemical devices can be either electrode assemblies or batteries comprising electrode assemblies and electrolytes, such as secondary batteries (such as lithium ion secondary batteries, sodium ion batteries, magnesium ion batteries, etc.), primary batteries (such as lithium primary batteries), etc., but not limited thereto.

There is no specific limitation on the type of the separator 13 in embodiments of the present application, and it can be any porous separator that can be used in electrochemical devices, such as glass fiber separator, non-woven separator, polyethylene separator, polypropylene separator, a polyvinylidene fluoride separator, and a multilayer composite film formed by one or more of them, but not limited thereto. The separator 13 is provided between the first electrode plate 11 and the second electrode plate 12, which can be used to isolate the first electrode plate 11 and the second electrode plate 12, and prevent the electrons in the electrochemical device from passing through, so as to facilitate the ions in the electrolyte to pass through.

The first electrode plate 11 may be a positive electrode plate or a negative electrode plate. The polarity of the second electrode plate 12 is opposite to that of the first electrode plate 11. For example, the first electrode plate 11 is a positive electrode plate, and the second electrode plate 12 is a negative electrode plate. For another example, the first electrode plate 11 is a negative electrode plate, and the second electrode plate 12 is a positive electrode plate.

The first electrode plate 11 comprises an active material layer. The active material layer comprises at least one first active material layer 111 and at least one second active material layer 112 provided along the length direction of the electrode plate (for example, the direction x shown by the arrow in FIG. 1). The first active material layer 111 and the second active material layer 112 may have different dimensions (length, width and/or coating thickness) and compacted densities.

In some embodiments, for example, on the first electrode plate 11 as shown in FIG. 1, there is only one first active material layer 111 and one second active material layer 112.

Figure 3:
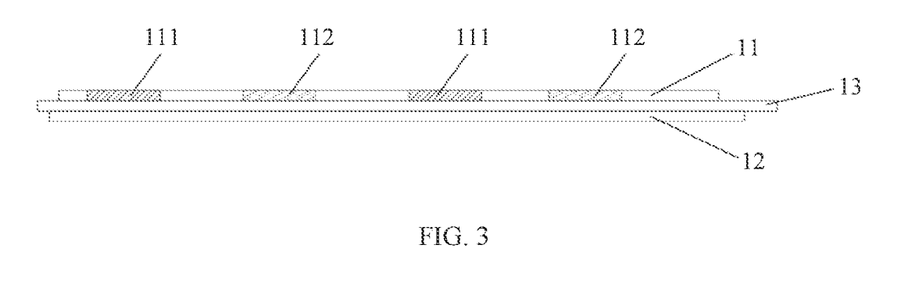
FIG. 3 is a cross-sectional view of a wound type battery core provided by an embodiment of the present application.

In other embodiments, for example, on the first electrode plate 11 as shown in FIG. 3, there may be multiple of the first active material layers 111 and the second active material layers 112. The plurality of the first active material layers 111 and the plurality of the second active material layers 112 are provided at intervals along the length direction of the electrode plate. In some embodiments, the plurality of the first active material layers 111 have different dimensions (length, width and/or coating thickness) and compacted densities; the plurality of the second active material layers 112 have different dimensions. The lithium ion diffusion rate of the first active material layer 111 is higher than that of the second active material layer 112, that is, the lithium ion kinetic performance of the first active material layer 111 is better than that of the second active material layer 112 (the lithium ion diffusion rate characterizes the kinetic performance), so that the lithium binding amount is small, which can reduce the occurrence of lithium evolution. In some embodiment of the present application, the lithium ion diffusion rate of the first active material layer 111 is greater than or equal to 1.2 times that of the second active material layer 112.

In some embodiments, the lithium ion diffusion rate of the first active material layer 111 is 2 to 3 times that of the second active material layer 112. The lithium ion diffusion rate of the active material layer can be used to characterize the kinetic properties of the active material layer. By arranging the first active material layer 111 and the second active material layer 112 with different lithium ion kinetic properties on the first electrode plate 11, and the kinetic properties of the first active material layer 111 are better, it can ensure the transport of lithium ions in the first active material layer 111 per unit time, and reduce the occurrence of lithium evolution in the electrochemical device (electrode assembly).

In some situations, the lithium ion diffusion rate of the first active material layer 111 may be in the range of $1.10^{-8}$ $cm^2/s$ to $2.0 \times 10^{-8}$ $cm^2/s$. The lithium ion diffusion rate of the second active material layer 112 may be in the range of $5.0 \times 10^{-9}$ $cm^2/s$ to $7.0 \times 10^{-9}$ $cm^2/s$.

In some embodiments, the lithium ion diffusion rates of the first active material layer 111 and the second active material layer 112 can be altered by changing the conductive agent content in the first active material layer 111 and the second active material layer 112 without losing energy density. And/or, the lithium ion diffusion rates of the first active material layer 111 and the second active material layer 112 can be altered by adjusting the compacted density of the active materials on the first active material layer 111 and the second active material layer 112, which further reduces the occurrence of lithium evolution.

Lithium ion diffusion rate refers to the degree to which lithium ions diffuse in a particular material. The lithium ion diffusion rate can be measured by using a galvanostatic intermittent titration technique (GITT) in the charge/discharge state. For example, the lithium ion diffusion rate can be measured by using GITT in a state of charge (SOC) of 50%.

In some embodiments, the electrode assembly obtained by winding will form a planar area 21 and a corner area 22 (as shown in FIG. 2), and the first active material layer 111 and the second active material layer 112 may be provided on the planar area 21 and the corner area 22 of the electrode assembly, respectively.

In other embodiments, the first electrode plate 11 may comprise a plurality of first active material layers 111 (for example, a first positive electrode active material layer or a second positive electrode active material layer) and a plurality of second active material layers 112. The plurality of first active material layers 111 and the plurality of second active material layers 112 are provided at intervals along the length direction of the electrode plate, so that there is a plurality of first active material layer 111 or second active material layer 112 on the planar area 21 and the corner area 22 of the electrode assembly obtained by winding. Examples are given below:

When the first electrode plate 11 is a positive electrode plate, the first active material layer 111 is the first positive electrode active material layer, the second active material layer 112 is the second positive electrode active material layer; and at least part of the first active material layer 111 is located on the planar area 21 of the electrode assembly, at least part of the second active material layer 112 is located in the corner area 22 of the electrode assembly.

When the first electrode plate 11 is a negative electrode plate, the first active material layer 111 is the first negative electrode active material layer, the second active material layer 112 is the second negative electrode active material layer; and at least part of the first negative electrode active material layer is located in the corner area 22 of the electrode assembly, at least part of the second negative electrode active material layer is located in the plane area 21 of the electrode assembly.

In some embodiments of the present application, the thickness of the corner area 22 of the electrochemical device is smaller than that of the planar area 21. For example, the thickness of the corner area 22 is 95%, 90%, 85%, or 80% of that of the planar area 21.

Of course, several situations described above can exist in one electrochemical device at the same time. For example, the positive electrode plate and the negative electrode plate of the electrochemical device adopt the structure disclosed in this application, and the first active material layer 111 of the positive electrode plate on the electrochemical device after winding is located in the plane area 21, and the first active material layer 111 of the negative electrode plate is located in the corner area 22.

In some embodiments, the first electrode plate 11 is a positive electrode plate, and the positive electrode plate can be prepared according to a conventional method in the art. For example, a positive electrode plate can be prepared by using a batch coating technique. The first active material layer 111 on the positive electrode plate is the first positive electrode active material layer, and the second active material layer 112 is the second positive electrode active material layer. The positive electrode active materials (for example, the first positive electrode active material, and the second positive electrode active material) may each independently include positive electrode active materials that are known in the art and are capable of reversibly deintercalating active ions, which is not limited in this application. For example, a positive electrode active material for a lithium ion secondary battery may include one or more of lithium transition metal composite oxides, composite oxides obtained by adding other transition metals or non-transition metals or non-metals to lithium transition metal composite oxides, where the transition metal can be one or more of Mn, Fe, Ni, Co, Cr, Ti, Zn, V, Al, Zr, Ce and Mg.

As an example, the positive electrode active material may be selected from one or more of lithium cobalt oxide, lithium nickel oxide, lithium manganese oxide, lithium nickel manganese oxide, lithium nickel cobalt manganese oxide, lithium nickel cobalt aluminum oxide, lithium-containing phosphates with olivine structure, such as $LiMn_2O_4$, $LiNiO_2$, $LiCoO_2$, $LiNi_{1-y}Co_yO_2$ ($0<y<1$), $LiNi_aCo_bAl_{1-a-b}O_2$ ($0<a<1$, $0<b<1$, $0<a+b<1$), $LiMn_{1-m-n}Ni_mCo_nO_2$ ($0<m<1$, $0<n<1$, $0<m+n<1$), $LiMPO_4$ (M can be one or more of Fe, Mn, Co) and $Li_3V_2(PO_4)_3$, $LiMn_{1-m-n}Ni_mCo_nO_2$ is, for example, $LiMn_{0.1}Ni_{0.8}Co_{0.01}O_2$, $LiMn_{0.3}Ni_{0.5}Co_{0.2}O_2$, $LiMn_{0.2}Ni_{0.6}Co_{0.2}O_2$, $LiMn_{1/3}Ni_{1/3}Co_{1/3}O_2$ and the like.

In some embodiments, the positive electrode active material layer further comprises an adhesive agent. The examples of the present application are not intended to limit the type of the adhesive agent to be used. As an example, the adhesive agent may be one or more of styrene butadiene rubber (SBR), water-based acrylic resin, sodium carboxymethyl cellulose (CMC-Na), polyvinylidene fluoride (PVDF), polytetrafluoroethylene (PTFE), ethylene-vinyl acetate copolymer (EVA), polyvinyl alcohol (PVA) and polyvinyl butyral (PVB).

In some embodiments, the positive electrode active material layer further comprises a conductive agent. The first positive electrode active material layer comprises a first positive electrode conductive agent, and the second positive electrode active material layer comprises a second positive electrode conductive agent. Embodiments of the present application do not limit the types of conductive agents. As an example, the first positive electrode conductive agent and the second positive electrode conductive agent may each independently include one or more of graphite, superconducting carbon, acetylene black, carbon black, Ketjen black, carbon dots, carbon nanotubes, graphene, and carbon nanofibers.

In some embodiments, the mass percentage of the first positive electrode conductive agent in the first positive electrode active material layer is 0.5% to 5.5%, and optionally, 1% to 2.5%. The mass percentage of the second positive electrode conductive agent in the second positive electrode active material layer is 0.5% to 5%, and optionally, 1% to 2%. The mass percentage of the first positive electrode conductive agent in the first positive electrode active material layer is greater than or equal to that of the second positive electrode conductive agent in the second positive electrode active material layer, which can make the lithium ion kinetics of the first active material layer 111 coated with the first positive electrode active material layer better than that of the second active material layer 112 coated with the second positive electrode active material layer, so that the occurrence of lithium evolution can be reduced.

In some embodiments, the compacted density of the second positive electrode active material layer is greater than or equal to that of the first positive electrode active material layer. It can be understood that the higher the compacted density, the lower the kinetics (diffusion rate) of lithium ions. Therefore, in some examples, the compacted density of the second positive electrode active material layer (in the corner area 22) is greater than or equal to that of the first positive electrode active material layer (in the planar area 21). At this time, the lithium ion kinetic performance of the first positive electrode active material layer (in the planar area 21) is poor, and the diffusion rate of lithium ions is small, which can improve the lithium evolution at the position of the negative electrode plate corresponding to a first positive electrode active material layer. In some embodiments, the second positive electrode active material layer may be disposed at a corner of the electrode assembly to reduce lithium evolution of the negative electrode plate at the corner.

In other embodiments, the first electrode plate 11 is a negative electrode plate, and the negative electrode plate can be prepared according to a conventional method in the art. For example, a positive electrode plate can be prepared by a batch coating technique. The first active material layer 111 on the negative electrode plate is the first negative electrode active material layer, and the second active material layer 112 is the second negative electrode active material layer. The negative electrode active materials (for example, the first negative electrode active material, the second negative electrode active material) may each independently include negative electrode active materials that are known in the art and are capable of reversibly deintercalating active ions, which is not limited in this application. For example, negative electrode active materials for lithium ion secondary batteries may include one or more of metallic lithium, natural graphite, artificial graphite, mesocarbon microbeads (abbreviated as MCMB), hard carbon, soft carbon, silicon, silicon-carbon composite, $SiO_x$ ($0<x<2$), Li—Sn alloy, Li—Sn—O alloy, Sn, SnO, $SnO_2$, lithium titanate with spinel structure and Li—Al alloy. In some embodiments, the first negative electrode active material and the second negative electrode active material include graphite having a capacity per gram of 300 mAh/g to 380 mAh/g. Preferably, the first negative electrode active material and the second negative electrode active material include graphite having a capacity per gram of 340 mAh/g to 370 mAh/g. In some embodiments, the first negative electrode active material and the second negative electrode active material are the same kind of graphite.

Further optionally, the negative electrode active material layer further comprises an adhesive agent, and embodiments of the present application does not limit the type of the adhesive agent to be used. As an example, the adhesive agent may be one or more of styrene butadiene rubber (SBR), water-based acrylic resin, sodium carboxymethyl cellulose (CMC-Na), polyvinylidene fluoride (PVDF), polytetrafluoroethylene (PTFE), ethylene-vinyl acetate copolymer (EVA), polyvinyl alcohol (PVA), and polyvinyl butyral (PVB).

In some embodiments, the negative electrode active material layer further comprises a conductive agent, and the type of the conductive agent to be used is not limited for embodiments of the present application. As an example, the conductive agent may be one or more of graphite, superconducting carbon, acetylene black, carbon black, Ketjen black, carbon dots, carbon nanotubes, graphene, and carbon nanofibers.

In some embodiments, the mass percentage of the first negative electrode conductive agent in the first negative electrode active material layer is 0.5% to 5.5%, and optionally, 1% to 2.5%. The mass percentage of the second negative electrode conductive agent in the second negative electrode active material layer is 0.5% to 5%, and optionally, 1% to 2%. The mass percentage of the first negative electrode conductive agent in the first negative electrode active material layer is greater than or equal to that of the second negative electrode conductive agent in the second negative electrode active material layer, which can make the lithium ion kinetics of the first negative electrode active material layer are superior to that of the second negative electrode active material layer, so that the occurrence of lithium evolution in the corner area can be reduced.

Some specific examples and comparative examples are listed below to better illustrate the present application, wherein a lithium-ion battery is used as an example. The following examples are merely used for illustrative purpose, and should not limit the protection scope of the present application.

Some examples of this application provide Example 1 to Example 4, Comparative Example 1, Example 5 to Example 7, and Comparative Example 2.

Example 1

Preparation of the positive electrode plate; an aluminum foil was used as the positive electrode current collector for the positive electrode, a positive electrode active material lithium cobaltate, a conductive agent conductive carbon black, and polyvinylidene fluoride were dissolved in N-methylpyrrolidone (NMP) solution at a weight ratio of 97.5:1.5:1.0 to form a first positive electrode slurry. The positive electrode active material lithium cobaltate, the conductive agent conductive carbon black, and polyvinylidene fluoride were dissolved in N-methylpyrrolidone (NMP) solution at a weight ratio of 97.5:1.4:1.1 to form a second positive electrode slurry. The first positive electrode slurry and the second positive electrode slurry were coated on the positive electrode current collector by using the spaced coating technology, with a coating thickness of 40 μm and each of a coating width of 6 mm. A first positive electrode active material layer and a second positive electrode active material were obtained. Then, a positive electrode plate was obtained through drying, cold pressing, and cutting.

Preparation of the negative electrode plate; graphite, sodium carboxymethyl cellulose (CMC) and adhesive agent styrene-butadiene rubber were dissolved in deionized water at a weight ratio of 97.7:1.3:1 to form a negative electrode slurry. A 10 μm-thick copper foil was used as the current collector of the negative electrode plate, and the negative electrode slurry was coated on the negative electrode current collector. The negative electrode plate was obtained after drying and cutting. Among them, the OI value of graphite was 6.

Preparation of the separator: the separator substrate was polyethylene (PE) with a thickness of 8 μm, and 2 μm alumina ceramic layers were coated on both sides of the separator substrate. Finally, 2.5 $mg/cm^2$ of adhesive agent polyvinylidene fluoride (PVDF) was coated on both sides which were coated with the ceramic layers, and dried.

Preparation of the electrolyte: in the case of water content with less than 10 ppm, $LiPF_6$ was added to a non-aqueous organic solvent (ethylene carbonate (EC):propylene carbonate (PC):diethyl carbonate (DEC) and dimethyl carbonate (DMC)=1:1:1:1, at a weight ratio) with a concentration of $LiPF_6$ of 1 mol/L, which was mixed evenly to obtain the electrolyte.

Preparation of the lithium ion battery: a positive electrode plate, a separator and a negative electrode plate were stacked in order, so that the separator was in the middle of the positive electrode plate and the negative electrode plate for isolation, which was wound to obtain the electrode assembly. After winding, the first positive electrode active material was located on the planar area of the positive electrode plate, and the second positive electrode active material layer was located on the corner area of the positive electrode plate.

The electrode assembly was placed in the outer packaging aluminum-plastic film. After dehydration at 80° C., the above-mentioned electrolyte was injected and packaged. The lithium ion battery was obtained through the process of chemical formation, degassing, and trimming.

Example 1 to Example 4 and Comparative Example 1 were different from Example 1 in that: when preparing the second positive electrode active material layer, the mass ratio of the positive electrode active material lithium cobaltate, the conductive agent conductive carbon black, and the polyvinylidene fluoride is different. The details were as follows in Table 1:

TABLE 1

| | The formulated ratio of the first positive electrode active material layer a:b:c | The formulated ratio of the second positive electrode active material layer a:b:c |
|---|---|---|
| Ex. 1 | 97.5:1.5:1.0 | 97.5:1.4:1.1 |
| Ex. 2 | 97.5:1.5:1.0 | 97.5:1.3:1.2 |
| Ex. 3 | 97.5:1.5:1.0 | 97.5:1.2:1.3 |
| Ex. 4 | 97.5:1.5:1.0 | 97.5:1.1:1.4 |
| Com. Ex. 1 | 97.5:1.5:1.0 | 97.5:1.5:1.4 |

The following method was used in the examples of the application to test the cycle performance of the battery:

The formed lithium-ion battery was charged at 25° C. with a constant current of 4.2 V at 3 C, and was then charged at a constant voltage to a current of 0.05 C. After standing for 5 minutes, it was discharged at 1 C to 2.8 V. As such, the charge-discharge cycle was performed for 1000 cycles. The discharge capacity of first cycle was recorded as D0, and the discharge capacity of the l000th cycle was recorded as D1:

1000-cycle capacity retention rate (%)=$D1/D0 \times 100\%$.

Figure 4:
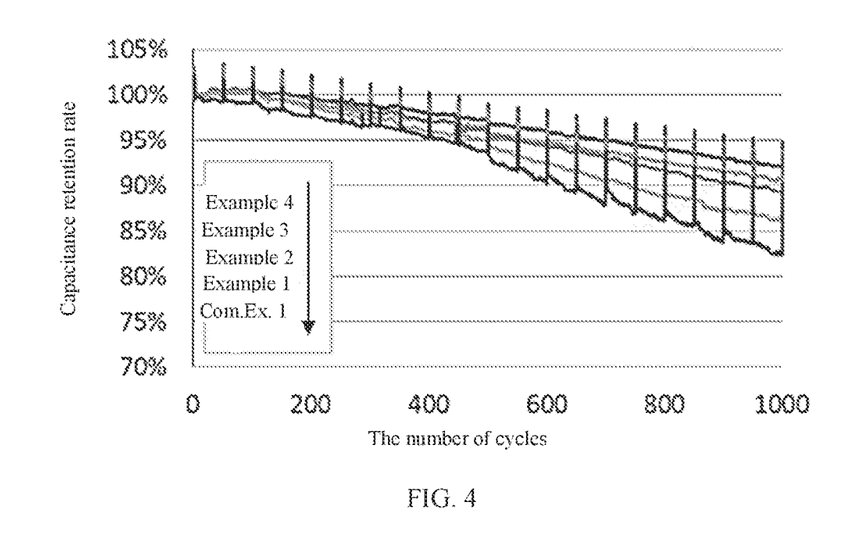
FIG. 4 is a first group of cell cycle performance curves provided by an embodiment of the present application.

The cycle performances of Examples 1 to 4 and Comparative Example 1 were tested respectively, and a graph of the test results of the capacitance retention rate and the number of cycles as shown in FIG. 4 was obtained.

Referring to FIG. 4, with the increase of the cycle number, the capacitance retention rates of Examples 1 to 4 were gradually decreased. In Examples 1 to 4, the content of the conductive agent in the corner area coated with the second positive electrode active material was gradually decreased. The capacitance retention ratios corresponding to Examples 1 to 4 were: Example 4>Example 3>Example 2>Example 1. In addition, it could be seen from the figure that Example 4>Example 3>Example 2>Example 1>Comparative Example 1. Accordingly, in the case that the content of the conductive agent in the first positive electrode active material layer was unchanged, the lower the content of the conductive agent in the second positive electrode active material layer was, the smaller the lithium ion kinetics in the corner area coated with the second positive electrode active material layer was, the less the lithium evolution occurred, and the better the cycle performance of the lithium-ion battery was.

By setting the mass percentage of the conductive agent in the second positive electrode active material layer located in the corner area to be smaller than that of the conductive agent in the first positive electrode active material layer located in the planar area, the lithium ion diffusion rate of the second positive electrode active material layer could be reduced, thereby helping to reduce the polarization of the negative electrode plate opposite to the second positive electrode active material layer, improving the lithium evolution and cycle performance of the electrochemical device. In addition, as the difference in percentage of the conductive agent in the second positive electrode active material layer and the first positive electrode active material layer was decreased, the difference in the lithium ion diffusion rates at the positions of the two parts was also decreased, and further the degree of improvement in the cycle performance of the electrochemical device was also reduced.

Examples 5 to 6, Comparative Example 2 was different from Example 1 in that: the mass ratio of the positive electrode active material lithium cobaltate, the conductive agent conductive carbon black, and the polyvinylidene fluoride when preparing the second positive electrode active material layer was the same as that the positive electrode active material lithium cobaltate, the conductive agent conductive carbon black, and the polyvinylidene fluoride when preparing the first positive electrode active material layer, both of which were 97.5:1.5:1.0. The compacted density of the first positive electrode active material layer and the second positive electrode active material layer in Examples 5 to 6 and Comparative Example 2 were shown in Table 2 below:

TABLE 2

| | The compacted density of the first positive electrode active material layer (g/cm³) | The compacted density of the second positive electrode active material layer (g/cm³) |
|---|---|---|
| Ex. 5 | 4.20 | 4.21 |
| Ex. 6 | 4.20 | 4.22 |
| Ex. 7 | 4.20 | 4.23 |
| Com. Ex. 2 | 4.20 | 4.20 |

Figure 5:
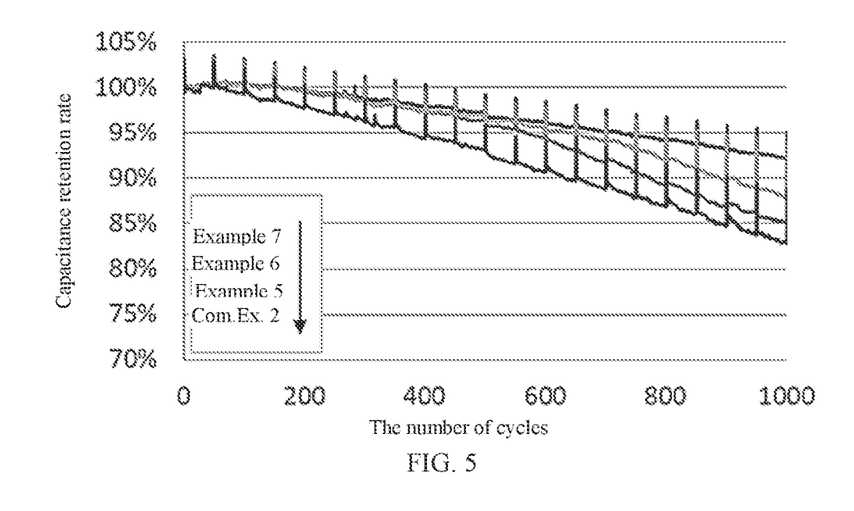
FIG. 5 is a second group of cell cycle performance curves provided by an embodiment of the present application.

The cycle performance test results of Examples 5 to 7 and Comparative Example 2 were shown in FIG. 5.

Referring to FIG. 5, with the increase of the cycle number, the capacitance retention ratios of Examples 5 to 7 and Comparative Example 2 were gradually decreased. In Examples 5 to 7, the compacted density of the second positive electrode active material layer was increasing, and correspondingly, the capacitance retention ratios in Examples 5 to 7 were: Example 7>Example 6>Example 5. In addition, it could be seen from the figure that Example 7>Example 6>Example 5>Comparative Example 2. Accordingly, the greater the compacted density in the corner area, the lower the kinetics of lithium ions on the corner area, and the less the occurrence of lithium evolution.

By setting the compacted density in the second positive electrode active material layer located in the corner area to be greater than that in the first positive electrode active material layer located in the planar area, the lithium ion diffusion rate of the second positive electrode active material layer could be reduced, thereby helping to reduce the polarization of the negative electrode plate opposite to the second positive electrode active material layer and improving the lithium evolution and cycle performance of the electrochemical device. In addition, as the difference in the compacted density between the second positive electrode active material layer and the first positive electrode active material layer was decreased, the difference in the lithium ion diffusion rates at the locations where the two parts were located was also decreased, and further the degree of improvement in the cycle performance of the electrochemical device was also reduced.

Some examples of the application provided Examples 8 to 10 and Comparative Example 3.

Example 8

Preparation of the positive electrode plate: an aluminum foil was used as the positive electrode current collector, and a positive electrode active material lithium cobaltate, a conductive agent conductive carbon black, and polyvinylidene fluoride were dissolved in N-methylpyrrolidone (NMP) solution at a weight ratio of 97.8:1.4:0.8, to form a slurry of the positive electrode active material layer. The slurry was coated on the positive electrode current collector with a coating thickness of 80 μm to obtain a positive electrode active material layer. Then, the positive electrode plate was obtained through drying, cold pressing, and cutting.

Preparation of the negative electrode plate: graphite, sodium carboxymethyl cellulose (CMC) and adhesive agent styrene-butadiene rubber were dissolved in deionized water at a weight ratio of 95:2:1:2, to form a first negative electrode slurry. Graphite, sodium carboxymethyl cellulose (CMC) and adhesive agent styrene-butadiene rubber were dissolved in deionized water at a weight ratio of 95:2.2:1:1.8, to form a second negative electrode slurry. The first negative electrode slurry and the second negative electrode slurry were coated on the current collector of the negative electrode plate by means of spaced coating, with a coating thickness of 120 μm and each of a coating width of 6 mm, to obtain a first negative electrode active material layer and a second negative electrode active material layer. The negative electrode plate was obtained after drying and cutting.

Preparation of the separator: the separator substrate was polyethylene (PE) with a thickness of 8 μm, and 2 μm alumina ceramic layers were coated on both sides of the separator substrate. Finally, 2.5 mg/cm² of adhesive agent polyvinylidene fluoride (PVDF) was coated on both sides which were coated with the ceramic layers, and dried.

Preparation of the electrolyte: in the case of water content with less than 10 ppm, $LiPF_6$ was added to a non-aqueous organic solvent (ethylene carbonate (EC):propylene carbonate (PC):diethyl carbonate (DEC) and dimethyl carbonate (DMC)=1:1:1:1, at a weight ratio) with a concentration of $LiPF_6$ of 1 mol/L, which was mixed evenly to obtain the electrolyte.

Preparation of the lithium ion battery: a positive electrode plate, a separator and a negative electrode plate were stacked in order, so that the separator was in the middle of the positive electrode plate and the negative electrode plate for isolation, which was wound to obtain the electrode assembly. The electrode assembly was placed in the outer packaging aluminum-plastic film. After dehydration at 80° C., the above-mentioned electrolyte was injected and packaged. The lithium ion battery was obtained through the process of chemical formation, degassing, and trimming.

Example 8 to Example 10, Comparative Example 3 were different from Example 1 in that: when preparing the first negative electrode active material layer, the mass ratio of the negative electrode active material graphite, sodium carboxymethyl cellulose (CMC) and the adhesive agent SBR was different. The details were shown in Table 3 below:

TABLE 3

| | The formulated ratio of the second negative electrode active material layer a:b:c:d | The formulated ratio of the first negative electrode active material layer a:b:c:d |
|---|---|---|
| Ex. 8 | 95:2:1:2 | 95:2.2:1:1.8 |
| Ex. 9 | 95:2:1:2 | 95:2.4:1:1.6 |
| Ex. 10 | 95:2:1:2 | 95:2.5:1:1.5 |
| Com. Ex. 3 | 95:2:1:2 | 95:2:1:2 |

Figure 6:
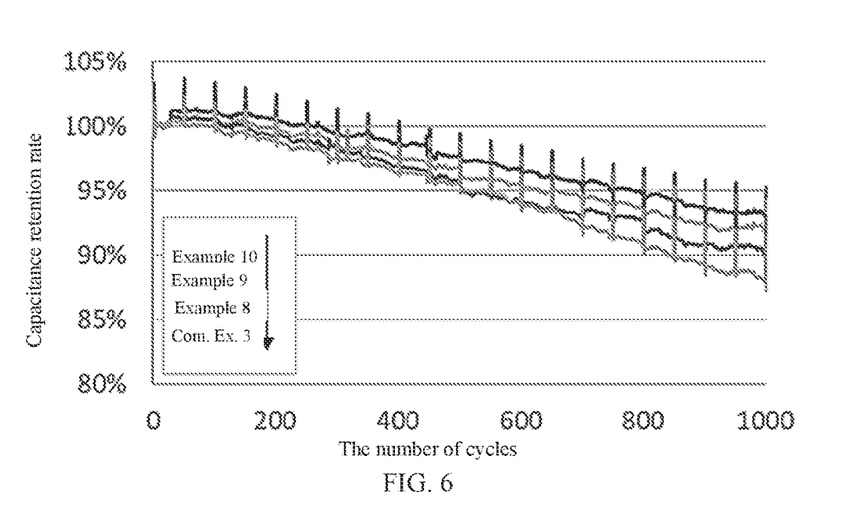
FIG. 6 is a third group of cell cycle performance curves provided by an embodiment of the present application.

The cycle performances of Examples 1 to 4 and Comparative Example 1 were tested respectively, and the test result diagram of the capacitance retention rate and the number of cycles as shown in FIG. 6 was obtained.

Referring to FIG. 6, with the increase of the cycle number, the capacitance retention rates of Examples 8 to 10 were gradually decreased. In Examples 8 to 10, the content of the conductive agent in the first negative electrode active material layer was gradually reduced, and correspondingly, the capacitance retention ratios in Examples 8 to 10 were: Example 10>Example 9>Example 8. In addition, it could be seen from the figure that Example 10>Example 9>Example 8>Comparative Example 3. Accordingly, in the case that the content of the conductive agent in the second negative electrode active material layer was unchanged, the higher the content of the conductive agent in the first negative electrode active material layer, the higher the kinetics of lithium ions on the corner area coated by the first negative electrode active material layer, and the less the occurrence of lithium evolution.

By setting the content of the conductive agent in the first negative electrode active material layer located in the corner area to be greater than that in the second negative electrode active material layer located in the planar area, the lithium ion diffusion rate of the first negative electrode active material layer could be increased, thereby helping to reduce the polarization of the first negative electrode active material layer, and improving the lithium evolution and cycle performance of the electrochemical device. In addition, as the difference in mass percentage of the conductive agent in the first negative electrode active material layer and the second negative electrode active material layer was decreased, the difference in the lithium ion diffusion rates at the positions where the two parts were located was also decreased, and further the degree of improvement in the cycle performance of the electrochemical device was also reduced.

Those skilled in the art will appreciate that the methods of making electrochemical devices (e.g., lithium ion batteries) described above are merely examples. Other methods commonly used in the art may be employed without departing from the disclosure of the present application.

Examples of the present application also provide electronic devices comprising the above-mentioned electrochemical devices. The electronic device in the examples of the application is not particularly limited, and it may be used in any electronic device known in the prior art. In some examples, electronic device may include, but are not limited to, notebook computers, pen input computers, mobile computers, e-book players, portable telephones, portable fax machines, portable copiers, portable printers, stereo headset, VCRs, LCD TVs, portable cleaners, portable CD players, mini discs, transceivers, electronic notepads, calculators, memory cards, portable recorders, radios, backup power supplies, motors, automobiles, motorcycles, assisted bicycles, bicycles, lighting device, toys, game consoles, clocks, power tools, flashlights, cameras, large-scale household storage batteries and lithium-ion capacitors, etc.

The above-mentioned description is only a preferred embodiment of the present application and an illustration of the applied technical principles. Those skilled in the art should understand that the scope of disclosure involved in this application is not limited to the technical solutions formed by the specific combination of the above-mentioned technical features, but also covers other technical solutions formed by any combination of the above-mentioned technical features or their equivalents. For example, a technical solution is formed by replacing the above-mentioned features with the technical features having similar functions disclosed in the present application.

The invention claimed is:

1. An electrochemical device, comprising an electrode assembly; wherein,
the electrode assembly comprises a first electrode plate, a second electrode plate and a separator;
the separator is provided between the first electrode plate and the second electrode plate;
the first electrode plate comprises an active material layer;
the active material layer comprises at least one first active material layer and at least one second active material layer;
the at least one first active material layer and the at least one second active material layer are provided alternatively with an interval between every adjacent first activate material layer and second active material layer along a length direction of the electrode plate; and
a lithium ion diffusion rate of the first active material layer is greater than or equal to 1.2 times a lithium ion diffusion rate of the second active material layer.

2. The electrochemical device of claim 1, wherein,
the electrode assembly is formed by winding the first electrode plate, the second electrode plate and the separator;
the electrode assembly includes a planar area and a corner area;
the first electrode plate is a positive electrode plate;
the first active material layer is a first positive electrode active material layer;
the second active material layer is a second positive electrode active material layer;
at least a portion of the first positive electrode active material layer is located in the planar area; and
at least a portion of the second positive electrode active material layer is located in the corner area.

3. The electrochemical device of claim 2, wherein,
the first positive electrode active material layer comprises a first positive electrode conductive agent;
the second positive electrode active material layer comprises a second positive electrode conductive agent; and
a mass percentage of the first positive electrode conductive agent in the first positive electrode active material layer is greater than or equal to a mass percentage of the second positive electrode conductive agent in the second positive electrode active material layer.

4. The electrochemical device of claim 3, wherein,
the mass percentage of the first positive electrode conductive agent in the first positive electrode active material layer is 0.5% to 5.5%; and the mass percentage of the second positive electrode conductive agent in the second positive electrode active material layer is 0.5% to 5%.

5. The electrochemical device of claim 2, wherein,
a compacted density of the second positive electrode active material layer is greater than or equal to a compacted density of the first positive electrode active material layer.

6. The electrochemical device of claim 1, wherein,
the electrode assembly is formed by winding the first electrode plate, the second electrode plate and the separator;
the electrode assembly comprises a planar area and a corner area;
the first electrode plate is a negative electrode plate;
the first active material layer is a first negative electrode active material layer;
the second active material layer is a second negative electrode active material layer;
at least a portion of the first negative electrode active material layer is located in the corner area; and
at least a portion of the second negative electrode active material layer is located in the planar area.

7. The electrochemical device of claim 6, wherein,
the second negative electrode active material layer comprises a second negative electrode conductive agent;
the first negative electrode active material layer comprises a first negative electrode conductive agent; and
a mass percentage of the first negative electrode conductive agent in the first negative electrode active material layer is greater than or equal to a mass percentage of the second negative electrode conductive agent in the second negative electrode active material layer.

8. The electrochemical device of claim 6, wherein,
the first negative electrode active material layer comprises a first negative electrode active material;
the second negative electrode active material layer comprises a second negative electrode active material; and
at least one of the first negative electrode active material or the second negative electrode active material includes a graphite having a capacity per gram of 300 mAh/g to 380 mAh/g.

9. The electrochemical device of claim 1, wherein,
the first electrode plate comprises a plurality of first active material layers and a plurality of second active material layers.

10. The electrochemical device of claim 9, wherein the plurality of the first active material layers and the plurality of the second active material layers are provided at intervals along the length direction of the electrode plate.

11. An electronic device, comprising an electrochemical device; wherein,
the electrochemical device comprises an electrode assembly;
the electrode assembly comprises a first electrode plate, a second electrode plate and a separator;
the separator is provided between the first electrode plate and the second electrode plate;
the first electrode plate comprises an active material layer;
the active material layer comprises at least one first active material layer and at least one second active material layer;
the at least one first active material layer and the at least one second active material layer are provided alternatively with an interval between every adjacent first activate material layer and second active material layer along a length direction of the electrode plate; and a lithium ion diffusion rate of the first active material layer is greater than or equal to 1.2 times a lithium ion diffusion rate of the second active material layer.

12. The electronic device of claim 11, wherein,
the electrode assembly is formed by winding the first electrode plate, the second electrode plate and the separator;
the electrode assembly includes a planar area and a corner area;
the first electrode plate is a positive electrode plate;
the first active material layer is a first positive electrode active material layer;
the second active material layer is a second positive electrode active material layer;
at least a portion of the first positive electrode active material layer is located in the planar area; and
at least a portion of the second positive electrode active material layer is located in the corner area.

13. The electronic device of claim 12, wherein,
the first positive electrode active material layer comprises a first positive electrode conductive agent;
the second positive electrode active material layer comprises a second positive electrode conductive agent; and
a mass percentage of the first positive electrode conductive agent in the first positive electrode active material layer is greater than or equal to a mass percentage of the second positive electrode conductive agent in the second positive electrode active material layer.

14. The electronic device of claim 13, wherein,
the mass percentage of the first positive electrode conductive agent in the first positive electrode active material layer is 0.5% to 5.5%; and
the mass percentage of the second positive electrode conductive agent in the second positive electrode active material layer is 0.5% to 5%.

15. The electronic device of claim 12, wherein,
a compacted density of the second positive electrode active material layer is greater than or equal to a compacted density of the first positive electrode active material layer.

16. The electronic device of claim 11, wherein,
the electrode assembly is formed by winding the first electrode plate, the second electrode plate and the separator;
the electrode assembly comprises a planar area and a corner area;
the first electrode plate is a negative electrode plate;
the first active material layer is a first negative electrode active material layer;
the second active material layer is a second negative electrode active material layer;
at least a portion of the first negative electrode active material layer is located in the corner area; and
at least a portion of the second negative electrode active material layer is located in the planar area.

17. The electronic device of claim 16, wherein,
the second negative electrode active material layer comprises a second negative electrode conductive agent;
the first negative electrode active material layer comprises a first negative electrode conductive agent; and
a mass percentage of the first negative electrode conductive agent in the first negative electrode active material layer is greater than or equal to a mass percentage of the second negative electrode conductive agent in the second negative electrode active material layer.

18. The electronic device of claim 16, wherein,
the first negative electrode active material layer comprises a first negative electrode active material;
the second negative electrode active material layer comprises a second negative electrode active material; and
at least one of the first negative electrode active material or the second negative electrode active material includes a graphite having a capacity per gram of 300 mAh/g to 380 mAh/g.

19. The electronic device of claim 11, wherein,
the first electrode plate comprises a plurality of first active material layers and a plurality of second active material layers.

20. The electronic device of claim 19, wherein the plurality of the first active material layers and the plurality of the second active material layers are provided at intervals along the length direction of the electrode plate.

* * * * *